Jan. 8, 1963   J. A. SAFFIR   3,071,861
DENTAL INSTRUMENTS
Filed May 27, 1960

INVENTOR
JACOB A. SAFFIR
BY Frederick W. Turnbull
ATTORNEY

3,071,861
DENTAL INSTRUMENTS
Jacob A. Saffir, Los Angeles, Calif., assignor to The Dentists' Supply Company of New York, York, Pa., a corporation of New York
Filed May 27, 1960, Ser. No. 32,188
9 Claims. (Cl. 32—27)

This invention relates to dental instruments and more especially to high speed dental drills such as used by dentists to prepare cavities to receive fillings.

High speed dental drills are known that are operated by an air turbine that rotates at many thousand revolutions per minute. These drills include anti-friction ball bearings which are necessarily very tiny as they must be housed in the drill head of the instrument. These minute ball bearings are not only very expensive but also have a very short life in use.

It is a principal object of the present invention to provide a dental drill of the high speed type that avoids the difficulties of the known drills, especially with respect to the useful life of the bearings.

Other and further objects and advantages will appear from the following specification taken with the accompanying drawing in which like characters of reference refer to similar parts in the several views and in which.

Figure 1:
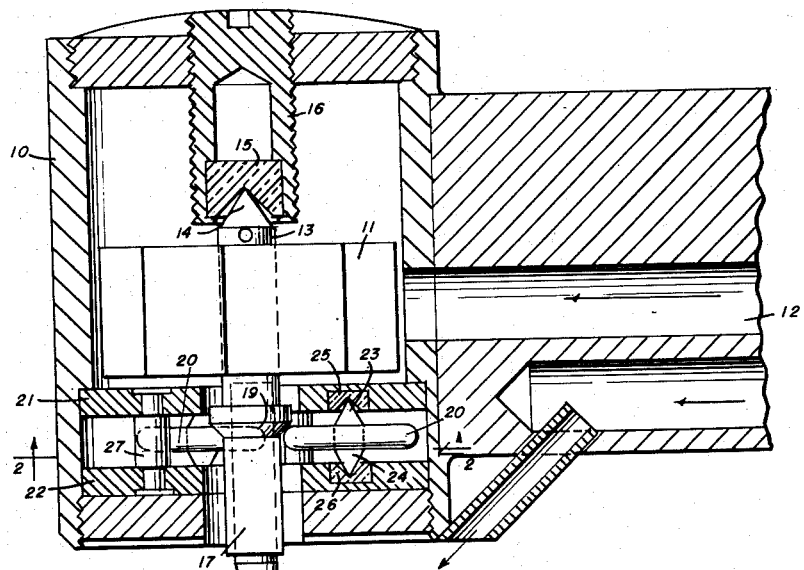
FIG. 1 is a section through the head of a dental drill incorporating the invention.

Referring now to FIG. 1 a turbine casing 10 encloses a turbine rotor 11. Air to drive the turbine rotor is supplied through a passage 12, a second passage (not shown) provides for the exhaust of the turbine.

Turbine rotor 11 is provided at one end with a shaft end 13 having a bearing point 14. A jewel bearing 15 receives the bearing point 14. The "jewel" may be of any very hard, wear-resistant material. Jewel 15 may conveniently be mounted in an adjustable mounting 16 permitting adjustment of the axial position of the jewel.

The shaft end 17 at the other axial end of turbine rotor 11 extends outwardly and is provided with an axial bore to receive a drill 18 in a conventional manner.

Near the turbine wheel a downwardly facing shoulder 19 surrounds the shaft 17. Below the shoulder 19 three or more bearing wheels 20 engage the shaft 17. These bearing wheels also engage shoulder 19 to prevent downward movement of the turbine rotor. It is noted in this connection that there will be only light stresses, principally the weight of the turbine rotor and drill that tends to thrust the rotor outwardly toward the drill. In use the axial thrust on the drill negatives such stress.

Figure 2:
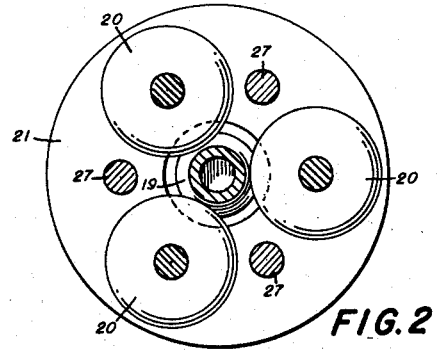
FIG. 2 is a section taken on line 2—2 of FIG. 1.

The anti-friction bearing wheels 20 are each pivoted to bearing plates 21 and 22 as seen in FIGS. 1 and 2 by jeweled pivots or trunnions 23 and 24 seated in jewel bearings 25 and 26. Jewels 25 and 26 are seated in bearing plates 21 and 22 respectively and are held in their properly spaced relation to bearing wheels 20 by studs 27 that accurately space bearing plates 21 and 22.

It will be noted that in use much of the thrust on the shaft will be radial. A second bearing assembly, such as shown in FIGS. 1 and 2, may be used above the turbine rotor 11 to bear on shaft 13. The end jewel 15, however, takes the upward end thrust so no shoulder 19 is usually required at the upper end of the rotor.

It will be seen then that the ball bearings of the known dental drills in this form of the invention have been entirely replaced by jeweled bearings.

Figure 4:
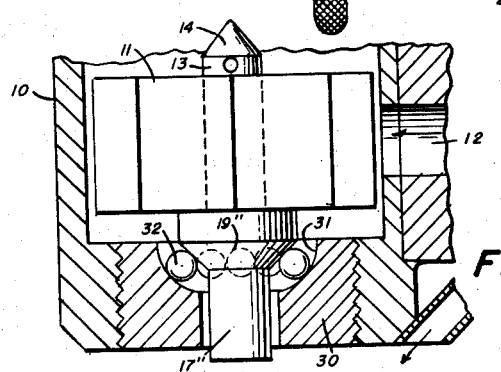
FIG. 4 is a fragmentary section similar to FIG. 1 showing a second modified bearing.
Figure 3:
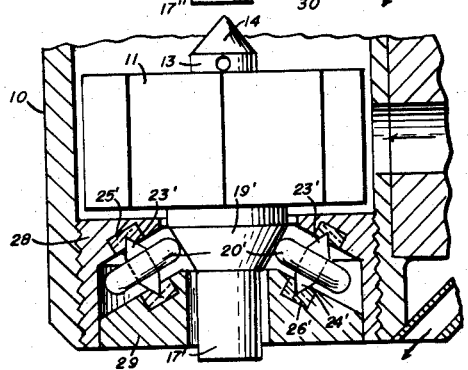
FIG. 3 is a fragmentary section similar to FIG. 1 showing a modified bearing.

In the modified dental drills of FIGS. 3 and 4, in each case, the upper end of the rotor shaft is pivoted by a jeweled bearing device such as shown at 14, 15, 16 of FIG. 1.

In FIG. 3 a lower bearing much like the assemblage 20, 21, 22, 23, 24, 25, 26 is seen as 20' 28, 29, 23', 24', 25', 26'. In this case the bearing wheels 20' are cocked with the extension lines of the centers of their trunnion axes intersecting the axes of the turbine rotor below, or outwardly, of the turbine casing; and the shoulder 19' on shaft 17' is a cone with its sides parallel to the axes of bearing wheels 20' so that the shoulder 19' operates both as the axial and the radial thrust absorbing surface supported by bearing wheels 20'.

The modification shown in FIG. 4, as noted above, uses the same jeweled bearing at the top of the turbine rotor. At the lower end the shaft 17" is formed with a conical surface 19" and a single element 30 of hard material is provided with a concave surface 31 surrounding the aperture through which shaft 17" extends. Balls 32 operate in much the same way as the cocked rollers 20' of FIG. 3.

By use of a bearing of this kind instead of the conventional ball bearing at the drill end of the shaft, much larger balls can be used. This can be done since this bearing need resist only radial, and a very little axial thrust in the one direction only. The jeweled pivot bearing taking the axial thrust in the opposite direction.

I claim:

1. In an air turbine dental handpiece or the like, a turbine casing, a turbine rotor having a hollow shaft extending axially from one end of said rotor, a stub shaft extending axially from the other end of said rotor, a hardened pointed bearing end on said stub shaft, a cup shaped jewel bearing mounted in one end of said casing to receive said pointed bearing end of said stub shaft, and anti-friction bearing means comprising a plurality of rollers supported by trunnions each pivotally mounted in fixed jeweled bearings surrounding the axially extending hollow shaft.

2. The device of claim 1 in which the axes of the trunnions are parallel to the axes of said turbine rotor.

3. The device of claim 1 in which said hollow shaft is provided with a tapered exterior surface which bears against said rollers.

4. The device of claim 3 in which the axes of said trunnions are parallel to the sides of said tapered surface, and said rollers each bear on said tapered surface.

5. The device of claim 1 in which a bearing means is provided surrounding said stub shaft comprising a plurality of rollers supported by trunnions, each pivotally mounted in jeweled bearings.

6. The device of claim 1 in which said cup shaped jeweled bearing is axially adjustable.

7. In an air driven dental handpiece or the like having a turbine rotor with a shaft extending axially therefrom, a bearing comprising at least three pairs of jeweled bearings, said pairs of jeweled bearings being spaced equidistantly about said shaft, a trunnioned wheel rotatably mounted between each said pair of jeweled bearings each said wheel bearing against said shaft.

8. The bearing of claim 7 in which said trunnioned wheels are of greater diameter than said shaft whereby the rotational speeds of said trunnions in said jeweled bearings is less than the rotational speed of said turbine rotor.

9. The bearing of claim 7 in which said pairs of bearings are set at an angle to the axis of said turbine rotor and said shaft is provided with a conical surface whereby said trunnioned wheels roll on said conical surface in planes normal to said conical surface.

References Cited in the file of this patent
UNITED STATES PATENTS 2,891,312     Ellis _____ June 23, 1959

OTHER REFERENCES

Nelson et al.: "Hydraulic Turbine Contra-Angle Handpiece," The Journal of the American Dental Assn. Pages 324–329, September 1953. (Copy in Div. 55, see pages 326 and 328.)